United States Patent [19]

Sivarajan et al.

[11] Patent Number: 5,543,953
[45] Date of Patent: Aug. 6, 1996

[54] SERVO CONTROL MECHANISM WITH WIDE INPUT DYNAMIC RANGE AND FAST RESPONSE

[75] Inventors: Kumar N. Sivarajan, Croton-on-Hudson, N.Y.; David G. Steinberg, Rehovot, Ireland

[73] Assignee: International Business Machines Corporation, Armonk, N.Y.

[21] Appl. No.: 305,126

[22] Filed: Sep. 13, 1994

[51] Int. Cl.$^6$ .................................................. H04B 10/06
[52] U.S. Cl. .......................................... 359/189; 359/194
[58] Field of Search .................................. 359/189, 190, 359/191, 194, 182, 187; 331/9, 11

[56] References Cited

U.S. PATENT DOCUMENTS

| | | | |
|---|---|---|---|
| 4,215,936 | 8/1980 | Wincour | 359/187 |
| 4,841,519 | 6/1989 | Nishio | 359/194 |
| 5,204,640 | 4/1993 | Logan, Jr. | 331/9 |
| 5,287,073 | 2/1994 | Den Braber | 331/11 |

*Primary Examiner*—Leo Boudreau
*Assistant Examiner*—Bhavesh Mehta
*Attorney, Agent, or Firm*—Douglas W. Cameron

[57] ABSTRACT

A servo control loop for tuning a center frequency of a tuning device to a desired frequency. More specifically, the dynamic range and response time of the servo loop are improved by closing the loop when the sign of the dither signal is such that the center frequency of filter would move towards the desired frequency when the loop is closed and by shifting the phase of the residual dither so that it adds at least partially in phase with the dither signal. The two components thus added are used to supply the control signal for the tuning device.

8 Claims, 3 Drawing Sheets

SERVO CONTROL MECHANISM WITH WIDE INPUT DYNAMIC RANGE AND FAST RESPONSE

TECHNICAL FIELD

This invention relates to a servo control loop for rapidly tuning a tuning device to a desired frequency. More specifically, this invention deals with a servo control loop with a high input dynamic range and a fast response time.

DESCRIPTION OF THE PRIOR ART

Consider the problem of controlling a piezo-electrically tuned Fabry-Perot filter in a optical network similar to "Rainbow" (See the article titled "A prototype circuit-switched multi-wavelength optical metropolitan-area network," by F. J. Janniello, R. Ramaswami and D. G. Steinberg in the Journal of Lightwave Technology, vol. 11, no. 5–6, May-June 1993) where fixed tuned transmitters and tunable receivers are employed. In this particular case, the desired signal optical wavelength is one of many wavelengths that could be present in a predefined wavelength (or frequency) range. The receiver has an optical filter that can be tuned by the application of a control signal (voltage). A periodic triangular scanning voltage is applied to the filter causing it to scan the predefined wavelength range till a desired wavelength is detected. At this point the scan is stopped but the filter is only tuned to a nominal frequency which approximates the desired optical wavelength. For more precise tuning and in order to keep the receiver locked to the desired wavelength, a servo loop is activated to provide a correction to the control voltage so that the filter's output is maximized. This maximization process is referred to as locking or acquiring the signal.

Because the various wavelengths might be received at considerably different powers, the servo circuitry should be capable of operating over a wide dynamic range of received optical signal powers. This variation in optical power might be as much as 40 dB (which corresponds to a range of 80 dB in electrical power!).

Moreover, in order to maximize the efficiency of the network, the scanning must be done as rapidly as possible and the acquisition or tuning time must be minimized. In particular, is desirable to make the acquisition time substantially smaller than the scanning period. An article titled "Method for increasing the tuning rate of a filter with inertia," by K. N. Sivarajan and D. G. Steinberg (IBM Technical Disclosure Bulletin, vol. 36, no. 11, Nov. 1993) discloses a method for fast scanning of the filter.

FIG. 1 shows the standard servo loop used for locking the filter. An optical signal 100 is input to an optical Fabry-Perot (FP) filter 110 at its signal input 111. The FP filter 110 has a tuning input 112, the voltage applied to which determines the optical wavelength that the filter is tuned to. The output optical signal from the FP filter is input to a photodetector 120 that converts the optical signal to an electrical one. Initially the switches 140 and 210 are open and the tuning voltage from the scanning signal generator 170 suitably amplified by the driver amplifier 230 is applied to the FP tiller. The tuning voltage is initially a periodic triangular waveform that sweeps the FP filter across the operating wavelength range of the system while the Scan and Lock Enable Program (SLEP) 220 transmits scanning control signals on line 175 to the scanning signal generator 170 until the desired signal is detected by the data receiver 240. The combination of the scanning signal generator 170 and the part of the SLEP that generates the scanning control signals can be used to implement a scanner. Data receiver 240 can be any device that converts the electrical signals at the output of the photodetector 120 to digital data. The SLEP 220 can be implemented in any standard microprocessor. While it is preferable to implement the SLEP in soft-ware, it can also be implemented in hardware, if necessary, by one of ordinary skill in the art. When the desired signal is detected the SLEP 220 fixes the tuning voltage at the current value and closes the switches 140 and 210. This causes the output of the dither oscillator 200 to be added to the (now fixed) tuning voltage and applied (after suitable amplification by the driver amp 230) to the FP filter. The application of a dither to the tuning input of the FP filter cause the photodetected output of the filter which is input to the synchronous detector 150 (which consists of a multiplier 155 and an integrator 160) to also have a dither component. However this dither is shifted in phase with respect to the dither oscillator output due to the inertia in the response of the FP filter. The phase-shift or compensation circuit 190 shifts is the phase of tile output of the dither oscillator by an amount approximately equal to the phase-shift in the dither signal introduced by the FP filter so that the dither signals applied to the inputs of the multiplier 155 in the synchronous detector are approximately in phase. Thus the synchronous detector demodulates the dither and this demodulated output is added to the tuning voltage and dither oscillator output and the sum generator at the output of adder 180 is applied on line 185 to the driver amplifier 230 and then to the FP filter. Ideally, if there is sufficient gain in the loop (which can be achieved by increasing the gain of amplifier 130), this causes the FP filter to tune so as to maximize the power at its output.

Servo loops similar to that of FIG. 1 have been considered by a number of inventors, e.g., Winocur (U.S. Pat. No. 4,215,936), Abrams and Nussmeier (U.S. Pat. 3,979,686), Boykin (U.S. Pat. No. 3,508,060), Weverka (U.S. Pat. No. 5,144,468), Sugiyama and Maeda (U.S. Pat. No. 4,352,981), Irujishima (4,310,911) and van Rosmalen (U.S. Pat. No. 4,063,287), for various applications. However all these loops have a relatively slow response time and/or small dynamic range.

The results of the operation of the servo loop of FIG. 1 will now be described. Consider the Following example. We assume a filter time constant of 50 µs which is derived from an experimentally measured value on an electro-optically tunable FP filter (manufactured by Micron Optics). We model the inertia of the filter by replacing the real (non-ideal) filter by a first order lowpass filter with the same time constant followed by an ideal filter. We assume that 1. there are three channels in the system, i.e., in the input optical signal 100: the desired wavelength $\lambda_0$ and two neighboring wavelengths $\lambda_0-\Delta$, and $\lambda_0+\Delta$.
2. the FWHM (Full Width Half Maximum) of the FP filter is $\Delta/2$ (this corresponds to a finesse equal to twice the number of channels),
3. all the channels have equal powers and that the servo is activated when the filter is tuned to $\lambda_0-0.3\Delta$.

Assume that the tuning voltage From the scanning signal generator 170 applied to the filter when the scanning is stopped would cause the filter to be tuned (under steady-state conditions) to $\lambda_0-0.2\Delta$. (The position of the filter lags the applied voltage due to its inertia.) It is the task of the servo loop to tune the filter to $\lambda_0$ and keep it locked there, as quickly as possible.

Let A be a quantity that is proportional to the photodetected voltage. It can be shown that the dynamic power range of the servo for locking within 20 ms is about 30 dB (electrical amplitude A=10 to 300) and that for A≧400 the filter's output does not achieve the maximum. It can also be shown that 200 ms is required for 50 dB of dynamic range (A=1 to 300).

For the servo loop illustrated in FIG. 1, an anomaly occurs as the power is increased: for a level of A=100, the filter approaches $\lambda_0$ but then backs off and stabilizes at a lower wavelength. This is due to the generation of an extraneous error arising from the DC content in the signal at the output of the photodetector. The explanation for this phenomenon is as follows. The photodetector is a unipolar de ice and therefore always has a DC component at its output. As the signal ramps up the filter's response, this DC value increases and therefore it cannot be eliminated by AC coupling into the servo. The synchronous detector multiplies this component by the dither oscillator output phase-shifted by the phase-compensation circuit 190 to compensate for the delay in time FP filter's response. Assume without loss of generality that the dither oscillator output after being phase-shifted by the circuit 190 is of the form $\sin(\omega t)$. This results in an error term of the form $-a \Delta\cos(\omega t)$ at the output of the integrator. If the phase-shift introduced by the phase compensation circuit 190 (or equivalently by the inertia of the FP filter) is close to 90 degrees the output of the dither oscillator is of the form $b \cos(\omega t)$. Thus, as long as a is less than b their sum has the correct phase. This results in the servo stabilizing the filter at a point where the slope of the filter's response curve is sufficient to produce enough dither modulation on the signal output by the filter to maintain its position. If however a is greater than b, their sum has the wrong phase and the servo will tend to minimize rather than maximize the signal.

The above phenomenon becomes more significant when gain compression is employed to increase the dynamic range of the servo. When this is the case, the compression tends to reduce the dither modulation as the signal level increases. As a result, as the signal level is increased, a point is eventually reached where the DC content is sufficiently high to completely swamp the effect of the desired dither.

There is, therefore, a need for a servo loop with increased dynamic range and response time.

SUMMARY OF THE INVENTION

Accordingly it is an object of the invention to provide a servo control loop with a high input dynamic range (e.g., a wide range of input optical signal powers 100 in FIG. 1) and a fast response time. A higher input dynamic range allows for a a greater geographic spread of an all-optical network. A faster response time enables better utilization of the available bandwidth by reducing the time spent by a receiver in acquiring the signal when it is not receiving useful data.

More specifically, this invention provides a servo control loop wherein the phase of a dither signal is detected, and the loop is closed when the sign of the dither signal is such that the center frequency of the tuning device would move towards the desired frequency at the moment when the loop is closed. A tuning device is for example a tunable optical filter, a tunable laser, a tunable electrical filter, and so forth.

Further, this invention provides a servo control loop for tuning the center frequency of a tuning device to a desired frequency wherein the phase of the residual dither component of the control signal is shifted so that this latter component adds at least partially in please with a component of the control signal generated by a dither signal. The residual dither signal is generated as a result of the DC component at the input of the synchronous detector of the loop, and the dither signal is generated from a dither oscillator of the same loop.

DESCRIPTION OF THE PREFERRED EMBODIMENT

The main reason for the limited dynamic range of the standard servo loop for our application is the fact that the output of the integrator 160 contains a component at the dither frequency that is almost opposite in phase to the output of the dither oscillator 200. To correct this problem a circuit 165 (See FIG. 2) at the output of the integrator 160 that shifts the phase of the residual dither so that it is now approximately in phase with the output of the dither oscillator. There are also other enhancements to the basic servo loop of FIG. 1 that are shown in FIG. 2 and these will be discussed below. The addition of circuit 165 increases the dynamic range from 30 dB to about 40 dB.

Any of a number of well-known phase-shifting circuits can be used for circuit 165. Since the dither is a sinusoid, this circuit 165 can merely be a low-pass filter that introduces the appropriate phase-shift. For the specific example FP filter is considered above, an example of such a circuit is a second order lowpass (LP) filter consisting of two identical first order LP filters in series, with the nominal cutoff frequency of this second order LP filter chosen to be 4 KHz so that this filter introduces a phase shift of approximately 140° in the 16 KHz dither (in addition to attenuating it by a factor of approximately 8).

Figure 1:
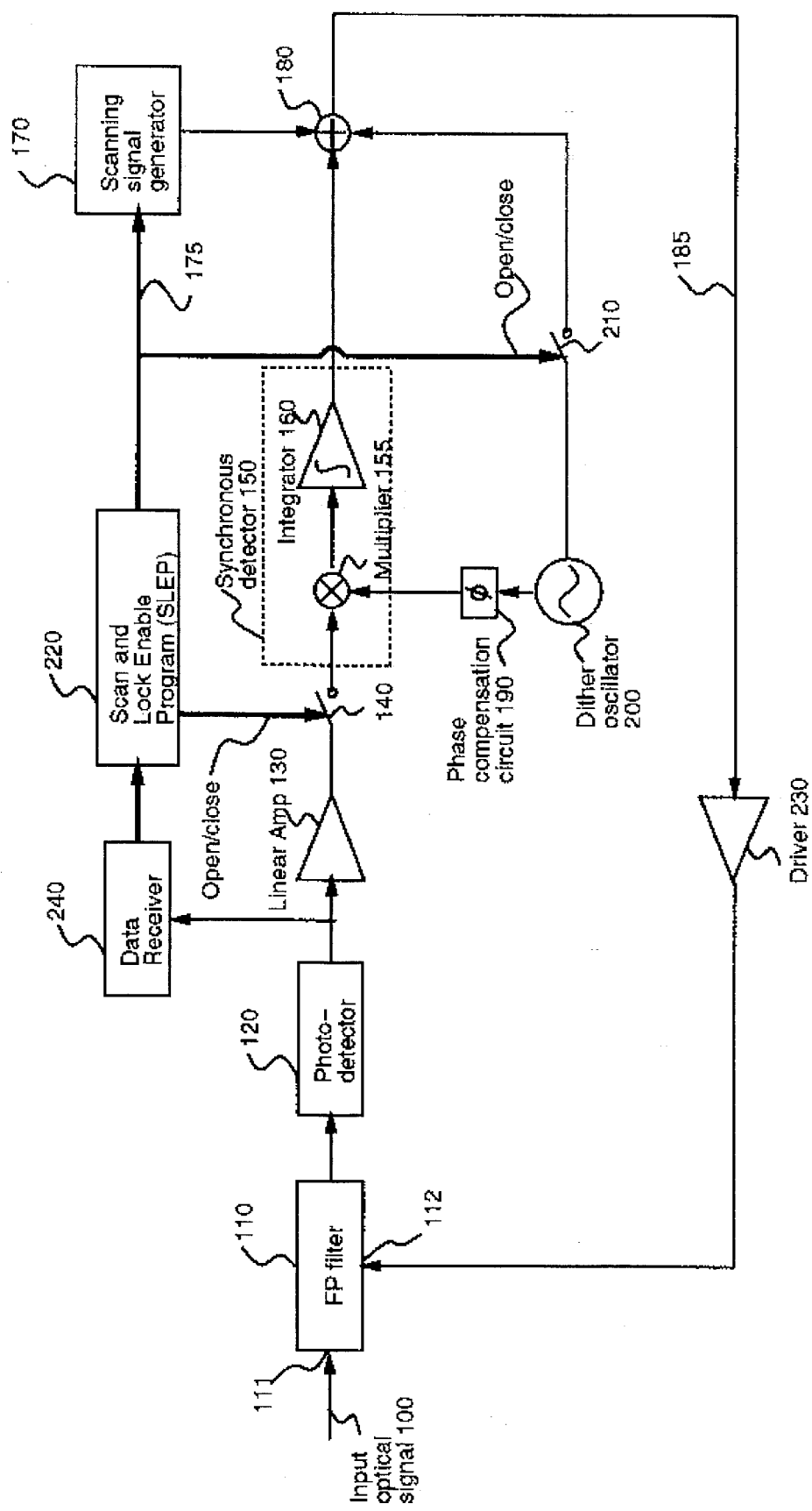
FIG. 1 is a schematic illustration of a standard servo control loop for controlling the center frequency of a Fabry-Pierot filter whose output is applied to a photo doctor.
Figure 2:
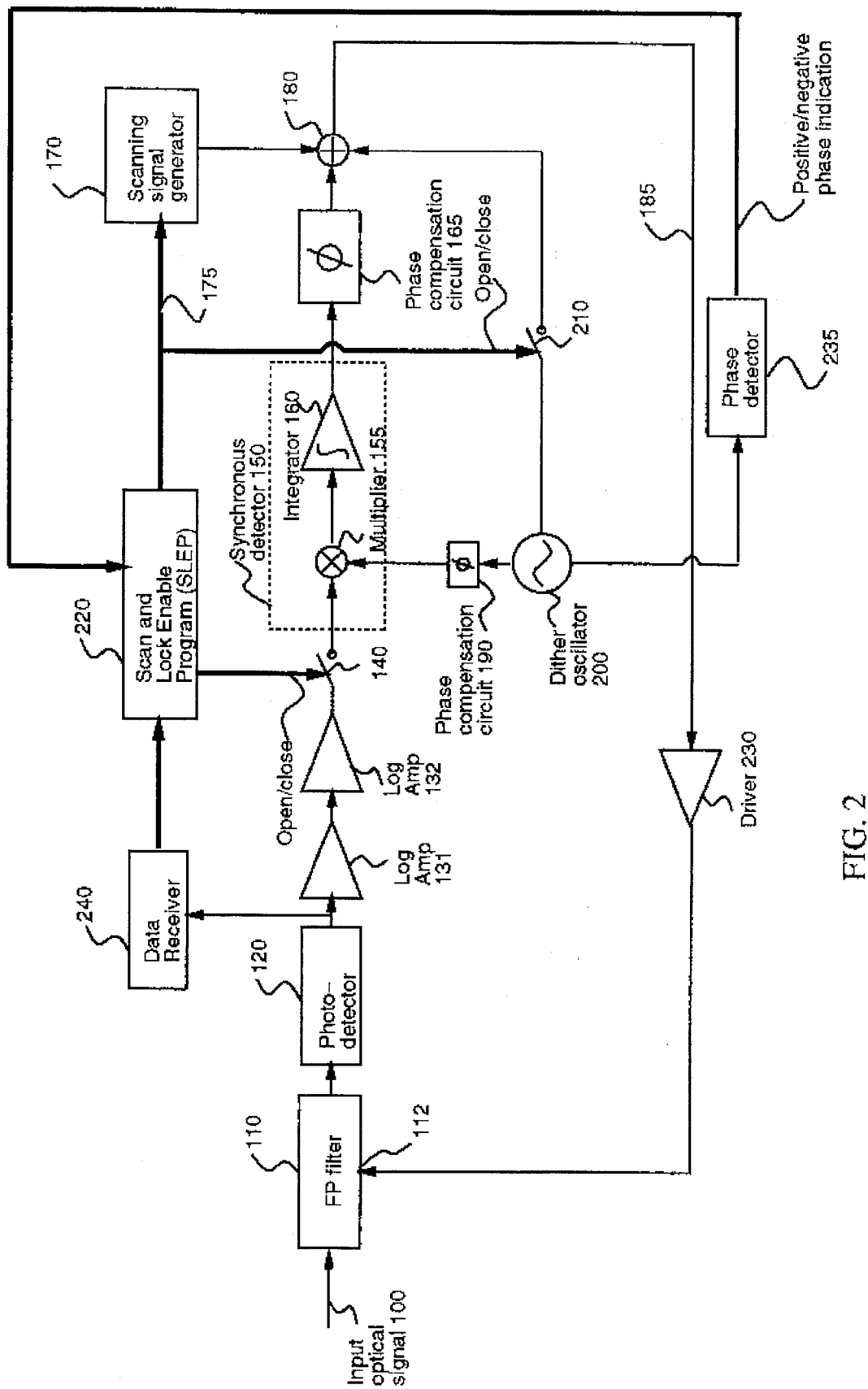
FIG. 2 is a schematic illustration of an enhanced servo loop in accordance with the invention.

In order to increase the dynamic range further, the linear amplifier 130 of FIG. 1 is replaced by a logarithmic amplifier 131 (See FIG. 2). Combined with the phase compensation circuit 165, a target dynamic range of 80 dB is achieved and the locking time is reduced to 6 ms from a previous time 20 ms.

Logarithmic gain compression can be achieved by the use of commercially available integrated circuits and since the introduction of gain compression in a servo loop is known in the prior art (e.g., van Rosmalen U.S. Pat. No. 4,063,287), its implementation is not described in detail here.

However, the ripple that is present at the output which is due to excessive gain in the servo loop is still undesirable and the locking time could be further reduced if this were eliminated. Therefore, we introduce a second logarithmic amplifier 132 (See FIG. 2) to increase the gain compression. The resulting performance is where the lock time is now about 3 ms.

Further, the phase of the dither oscillator when the servo loop is first closed is of considerable importance in determining the behavior of the servo. When the dither first multiplies the DC component of the signal and is integrated, the sign of the result depends on the phase of the dither. If the initial phase has the wrong sign, the integrator output will be a signal that will initially pull the filter in the wrong direction. To overcome this pulling in the wrong direction, the Scan and Lock Enable Program (SLEP) 220 is modified such that, at the point of closing the switches 140 and 210, the phase of the dither oscillator 200 causes the FP filter 110 to move towards $\lambda_0$. This modification is schematically illustrated in FIG. 2 where the SLEP 220 now determines the direction (increasing or decreasing) of the triangular scanning tuning voltage and the phase of the dither oscillator before closing the switches 140 and 210. To illustrate the importance of this last modification, suppose the SLEP were to close the loop (by closing the switches 140 and 210) at a point in time when the phase of the dither oscillator was reversed. It can be shown that the filter initially moves away from $\lambda_0$ and then moves towards it resulting in the locking time increasing from 3 ms to about 10 ms.

Figure 3:
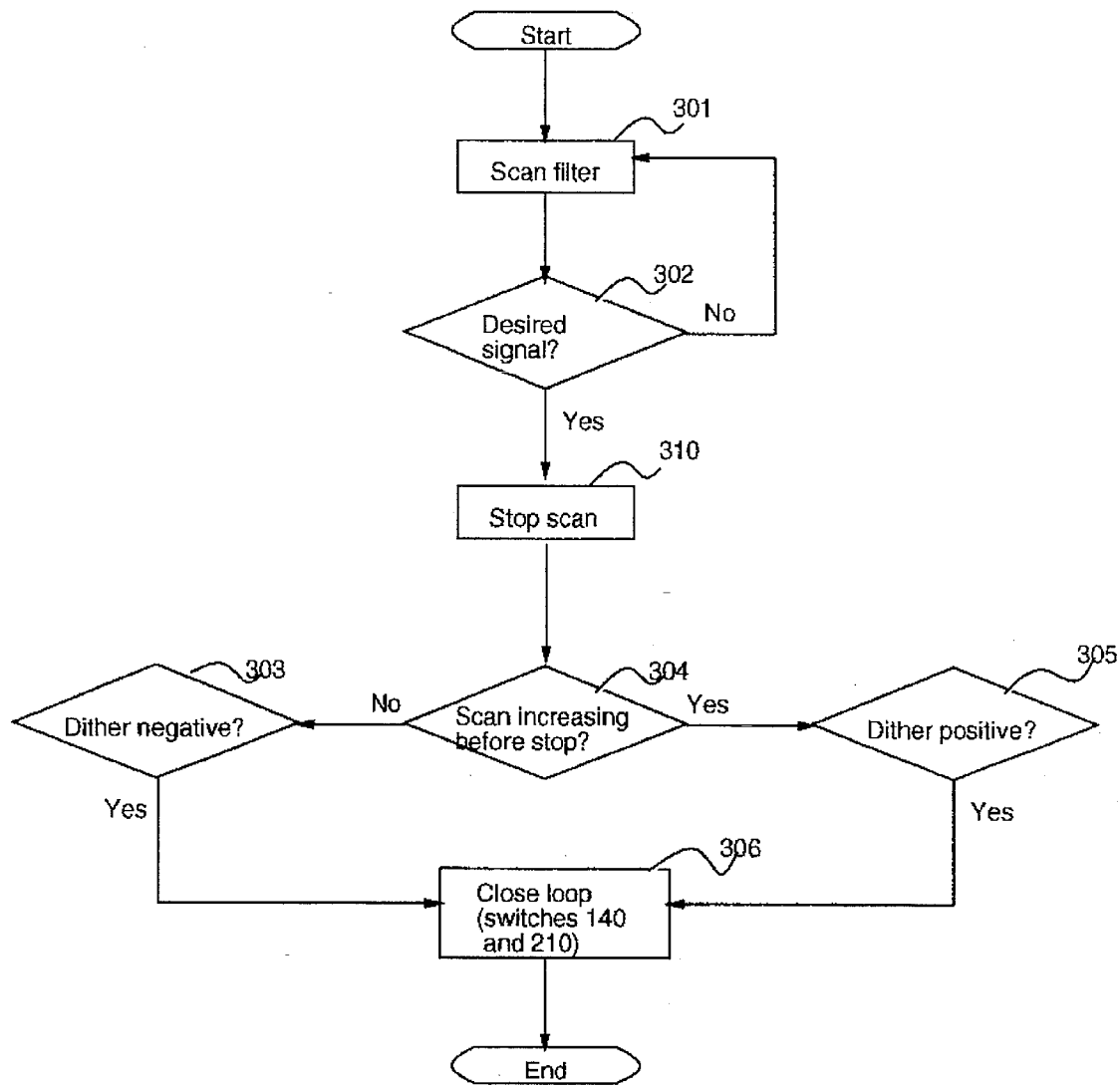
FIG. 3 illustrates the apparatus for shifting the phase the residual dither and the means for closing the loop when the sign of the dither signal is such that the center frequency of the filter moves towards the desired center frequency at the moment when the loop is closed.

A flow chart describing the SLEP 220 is shown in FIG. 3. The steps performed by the the SLEP are as follows.

1. Scan the filter 301, i.e., send scanning control signals on line 175 to the scanning signal generator 170 to periodically vary the tuning voltage applied to the filter using a triangular waveform, to sweep it across the desired wavelength range till a desired signal is detected 302 by the data receiver 240, i.e., the center frequency of the filter is at a nominal frequency that is close to the center frequency of the desired signal.

2. Upon reaching the nominal frequency in step 1 (302), stop the voltage scan 310 and fix the voltage.

3. If the voltage scan was increasing (304) when the nominal frequency was reached, close the loop (306) when the phase detector 235 detects the dither oscillator output to be positive (305).

4. If the voltage scan was decreasing (304) when the nominal frequency was reached, close the loop (306) when the phase detector 235 detects the dither oscillator output to be negative (303).

The last modification is reducing the amplitude of the dither oscillator after the filter is locked. There is some ripple left after the filter achieves lock, and this causes a degradation in the Signal to Noise Ratio (SNR) by about 0.4 dB for several milliseconds. Even this degradation can be virtually eliminated by reducing the amplitude of the dither oscillator by a factor of 5 after 3 ms.

The third enhancement we make is to change the Scan and Lock Enable Program (SLEP) 220 to close the switches 140 and 210 when the dither oscillator 200 has the right phase.

The performance of the servo loop described above was obtained using this mathematical model which we will now describe. Consider the model of the servo loops shown in FIGS. 1 and 2. In our particular implementation of the synchronous detector, the input is multiplied by a ±1 square wave at the dither frequency rather than a sinusoid. Let e(t) be the error voltage at the output of the integrator, y(t) the error voltage at the output of the phase compensation filter and x(t) the wavelength (measured in nm) the filter is tuned to at time t. Assume that the filter tunes K nm/volt and that it is tuned to wavelength $\lambda_0$ when no voltage is applied. Assume that the filter is tuned to $\lambda_{init}$ at t=0 and that the voltage applied to the filter is V (constant) For t≧0. Let $\omega_f$ be the cutoff frequency of the phase compensation filter (4 kHz). Let $A_l$, $A_O$ and $A_r$ be the (photodetected) voltages corresponding to the wavelength at $\lambda_0-\Delta$, $\lambda_0$ and $\lambda_0+\alpha$ respectively. The operation of the loop is governed by the differential equations $$\frac{de}{dt} = \text{sgn}(\cos(\omega t - \arctan(\omega\tau) + \phi))G(A_l f(x + \Delta) + A_0 f(x) + A_k f(x - \Delta)),$$

$$\frac{d^2 y}{dt^2} + 3\omega_f \frac{dy}{dt} = \omega_f^2(e(t) - y(t)),$$

and $$\tau \frac{dx}{dt} = K(V + A_d \cos(\omega t + \phi)) + y(t) - x(t),$$

where $$\text{sgn}(z) = \begin{cases} 1, & z > 0, \\ -1, & z < 0, \end{cases}$$

and $$f(z) = \frac{1}{1 + (2F/\pi)^2 \sin^2(\pi z)}$$

is the Fabry-Perot filter transfer function (F is the finesse of the filter) and G() is the gain function of the amplifier which we describe further below.

Since we assume that all the channels have equal powers we set $A_l = A_0 = A_r =$. (If the phase compensation filter is absent, as in FIG. 1, we set y(t)=e(t).)

$$G(z) = G_{lin} z$$

for a linear amplifier, $$G(z) = G_{log} \log_{10}(1+z)$$

for a logarithmic amplifier and $$G(z) = G_{loglog} \log_{10}(1+\log_{10}(1+z))$$

for two logarithmic amplifiers in cascade.

Now it is straightforward, to solve these differential equations (numerically) given the initial values of x, e and y the voltage V and the various parameters of the servo loop. The parameters that were used to obtain the results of the previous section were e(0)=y(0)=0, x(0)=$\lambda_{init}$=$\lambda_0$−0.3Δ, Δ=0.02 FSR, K=0.05 nm/volt, KV=$\lambda_0$−0.2Δ, $A_d$=0.05 volts, $G_{lin}$=0.01, $G_{log}$=2.0, $G_{loglog}$=8.0. A is varied From 1 to 10,00 in the various examples.

Having thus described our invention, what we claim as new and desire to secure by Letters Patents is:

1. A servo control loop for tuning a center frequency of a tuning device to a first center frequency of a desired signal where said tuning device is tuned by application of an electrical control signal from said loop, said loop comprising:

a dither oscillator for generating a dither signal for varying said control signal applied to said filter so that the center frequency of said tuning device varies over a range of frequencies;

a phase detector for detecting the sign of said dither signal; and means for closing the loop at a time when the sign of said dither signal is such that said center frequency of the tuning device would move towards without first moving away from, said first center frequency when said loop is closed, whereby said center frequency of said tuning device is set to said desired first frequency.

2. A servo control loop as recited in claim 1 wherein said filter is an optical filter.

3. A servo control loop for tuning a center frequency of a tuning device to a first center frequency of a desired signal where said tuning device is tuned by application of an electrical control signal from said loop, said loop comprising:

- a dither oscillator for generating a dither signal for varying said control signal applied to said tuning device so that the center frequency of said tuning device varies over a range of frequencies, said dither signal being a first component of said control signal;
- a synchronous detector for generating a second component of said control signal after closing said loop where said second component has a residual dither signal generated as a result of a DC component at the input of said synchronous detector;
- an adder for adding at least said first and said second components of said control signal;
- a first and second switch with said first switch interconnecting an output of said dither oscillator to said adder and with another of said switches interconnecting an output of said tuning device with an input of said synchronous detector where said loop is closed when said first and second switch are closed; and
- a phase-shifting circuit for shifting the phase of said residual dither in said second component of said control signal so that the resulting said second component adds at least partially in phase with said first component using said adder when said first and second switches are closed, whereby said center frequency of said tuning device is set to said desired first frequency by application said first and second components of said control signal to said tuning device from said adder.

4. A servo control loop as recited in claim 3, wherein said tuning device is an optical filter.

5. A servo control loop for tuning a center frequency of a tuning device to a first center frequency of a desired signal where said tuning device is tuned by application of an electrical control signal from said loop, said loop comprising:

- a scanner for generating said control signal to scan said tuning device across a desired first frequency range which includes said first center frequency wherein said scanner stops scanning when said center frequency of said tuning device is at a nominal frequency close to said first center frequency;
- a dither oscillator for generating a dither signal for varying said control signal applied to said tuning device so that said center frequency of said tuning device varies over a second range or frequencies;
- a phase detector for detecting the sign of said dither signal; and means for closing the loop after stopping said scanner at a time when the sign of said dither signal is such that said center frequency of the tuning device would move towards, without first moving away from, said first center frequency when said loop is closed, whereby said center frequency of said tuning device is set to said desired first center frequency.

6. A servo loop as recited in claim 5, wherein said tuning device is an optical filter.

7. A servo control loop for tuning a center frequency of a tuning device to a first center frequency of a desired signal where said tuning device is tuned by application of an electrical control signal from said loop, said loop comprising:

- a scanner for generating a first component of said control signal to scan said tuning device across a desired first frequency range which includes said first center frequency wherein said scanner stops scanning when said center frequency of said tuning device is at a nominal frequency close to said first center frequency;
- a dither oscillator for generating a dither signal for varying said control signal applied to said tuning device so that said center frequency of said tuning device varies over a second range of frequencies, said dither signal being a second component of said control signal;
- a synchronous detector for generating a third component of said control signal after closing said loop where said third component has a residual dither signal generated as a result of a DC component at the input of said synchronous detector;
- an adder for adding at least said first, second and third components of said control signal;
- a first and second switch with said first switch interconnecting an output of said dither oscillator to said adder and with another of said switches interconnecting an output of said tuning device with an input of said synchronous detector where said loop is closed when said first and second switch are closed; and
- a phase-shifting circuit for shifting the phase of said residual dither in said third component of said control signal so that the resulting said third component adds at least partially in phase with said second component, using said adder when said first and second switches are closed whereby said center frequency of said tuning device is set to said desired first frequency by application of said first, second, and third components to said first, second, and third components to said tuning device from said adder.

8. A servo control loop as recited in claim 7 wherein said tuning device is an optical filter.

* * * * *

UNITED STATES PATENT AND TRADEMARK OFFICE
CERTIFICATE OF CORRECTION

PATENT NO. : 5,543,953
DATED : AUGUST 6, 1996
INVENTOR(S) : KUMAR N. SIVARAJAN
DAVID G. STEINBERG

It is certified that error appears in the above-indentified patent and that said Letters Patent is hereby corrected as shown below: On the title page: Item [75]

[Rehovot, Ireland] --Rehovot, Israel--

Signed and Sealed this

Seventh Day of January, 1997

Attest:

BRUCE LEHMAN

Attesting Officer

Commissioner of Patents and Trademarks